United States Patent
Kato et al.

(10) Patent No.: US 12,194,977 B2
(45) Date of Patent: Jan. 14, 2025

(54) BRAKING CONTROL DEVICE

(71) Applicant: ADVICS CO., LTD., Kariya (JP)

(72) Inventors: Osayoshi Kato, Kariya (JP); Yoshio Masuda, Kariya (JP)

(73) Assignee: ADVICS CO., LTD., Kariya (JP)

( * ) Notice: Subject to any disclaimer, the term of this patent is extended or adjusted under 35 U.S.C. 154(b) by 574 days.

(21) Appl. No.: 17/595,266

(22) PCT Filed: May 18, 2020

(86) PCT No.: PCT/JP2020/019665
§ 371 (c)(1),
(2) Date: Nov. 12, 2021

(87) PCT Pub. No.: WO2020/235531
PCT Pub. Date: Nov. 26, 2020

(65) Prior Publication Data
US 2022/0203944 A1 Jun. 30, 2022

(30) Foreign Application Priority Data
May 22, 2019 (JP) .................................. 2019-096006

(51) Int. Cl.
*B60T 8/17* (2006.01)
*B60T 8/40* (2006.01)
*B60T 13/20* (2006.01)

(52) U.S. Cl.
CPC ......... *B60T 8/17* (2013.01); *B60T 8/40* (2013.01); *B60T 13/20* (2013.01)

(58) Field of Classification Search
CPC ...................................................... B60T 13/20
See application file for complete search history.

(56) References Cited

U.S. PATENT DOCUMENTS

2012/0248861 A1* 10/2012 Miyata ................. B60T 13/686
60/579
2018/0093652 A1 4/2018 Nakaoka et al.

FOREIGN PATENT DOCUMENTS

CN 104080670 A * 10/2014 ............ B60T 11/103
DE 112011104953 T5 * 11/2013 ................ B60T 1/10
(Continued)

OTHER PUBLICATIONS

International Search Report (PCT/ISA/210) with English translation and Written Opinion (PCT/ISA/237) mailed on Aug. 4, 2020, by the Japanese Patent Office as the International Searching Authority for International Application No. PCT/JP2020/019665.

*Primary Examiner* — Melody M Burch
(74) *Attorney, Agent, or Firm* — BUCHANAN INGERSOLL & ROONEY PC (57) ABSTRACT

A brake control device includes a brake operation member, a pressurization unit, a master cylinder unit, a connection path connecting a separation chamber and a reaction force chamber, an electromagnetic valve at the connection path, and a control device. The control device includes a specified control section configured to, when the brake operation member is operated in a closed state of the electromagnetic valve, execute activation-time control in which the pressurization unit supplies fluid to a servo chamber based on a predetermined pattern, a determination section configured to determine whether a pressure difference between pressure in the reaction force chamber and pressure in the separation chamber, is equal to or less than a threshold value, and a valve control section configured to open the electromagnetic valve when the determination section determines the pressure difference is equal to or less than the threshold value after start of the activation-time control.

8 Claims, 3 Drawing Sheets

(56) References Cited

FOREIGN PATENT DOCUMENTS

| | | | |
|---|---|---|---|
| JP | 2012206683 A | * 10/2012 | |
| JP | 2016144968 A | 8/2016 | |
| JP | 2017210215 A | * 11/2017 | ............. B60T 13/14 |

* cited by examiner

BRAKING CONTROL DEVICE

TECHNICAL FIELD

The present disclosure relates to a braking control device.

BACKGROUND ART

A braking control device includes a master cylinder unit including a master cylinder, an input piston that operates in conjunction with a brake pedal, a master piston and the like. For example, as disclosed in JP-A-2016-144968, a servo chamber, a separation chamber, and a reaction force chamber are formed in the master cylinder. The servo chamber is a portion to which fluid is supplied when the master piston moves forward, and the master piston moves forward by an increase in a volume of the servo chamber. The separation chamber is a portion formed between the input piston and the master piston. The reaction force chamber is a portion of which a volume decreases as the master piston moves forward. The separation chamber and the reaction force chamber are connected by a connection path. An electromagnetic valve is disposed at the connection path. When the electromagnetic valve is opened, a control mode is switched to a by-wire mode in which the input piston and the master piston are not mechanically in conjunction with each other. The braking control device normally controls a braking force in the by-wire mode. The braking control device is configured such that the reaction force chamber and a reservoir are blocked in the by-wire mode, and the reaction force chamber and the reservoir communicate with each other in a mode other than the by-wire mode.

CITATION LIST

Patent Literature

PTL 1: JP-A-2016-144968

SUMMARY

Technical Problem

Here, when the brake pedal is operated in a state in which the electromagnetic valve is closed, a pressure in the separation chamber increases with the forward movement of the input piston. On the other hand, when the master piston does not move forward or the reaction force chamber and the reservoir communicate with each other in a state in which the connection path is blocked by the electromagnetic valve, a pressure in the reaction force chamber does not change. That is, when the separation chamber and the reaction force chamber are blocked from each other, the pressure in the separation chamber becomes higher than the pressure in the reaction force chamber by the operation of the brake pedal. In this state, when the electromagnetic valve is opened in order to switch to the by-wire mode, the separation chamber and the reaction force chamber communicate with each other, and the pressure in the separation chamber, which is relatively high, decreases. As the pressure in the separation chamber decreases, a phenomenon occurs in which the input piston and the brake operation member move forward. This phenomenon may give a feeling of discomfort to a driver. That is, in the braking control device, there is room for improvement in a brake feeling when the by-wire mode is started, that is, when the electromagnetic valve is opened.

The disclosure has been made in view of the above circumstances, and an object of the disclosure is to provide a braking control device capable of improving a brake feeling when an electromagnetic valve is opened.

Solution to Problem

A braking control device according to the disclosure includes: a brake operation member; a pressurization unit configured to discharge fluid; a master cylinder unit including an input piston configured to slide in accordance with an operation of the brake operation member, a separation chamber of which a volume changes in accordance with the sliding of the input piston, a servo chamber of which a volume increases in accordance with a supply of the fluid from the pressurization unit, a master piston configured to slide in one direction in accordance with an increase in the volume of the servo chamber, and a reaction force chamber of which a volume decreases in accordance with sliding of the master piston in one direction; a connection path connecting the separation chamber and the reaction force chamber; an electromagnetic valve provided at the connection path; and a control device configured to control the electromagnetic valve and the pressurization unit. The control device includes: a specified control section configured to, when the brake operation member is operated in a state in which the electromagnetic valve is closed, execute activation-time control in which the pressurization unit supplies the fluid to the servo chamber based on a predetermined pattern; a determination section configured to determine whether a pressure difference between a reaction force pressure, which is a pressure in the reaction force chamber, and a separation pressure, which is a pressure in the separation chamber, is equal to or less than a first threshold value; and a valve control section configured to, when the determination section determines that the pressure difference is equal to or less than the first threshold value after the activation-time control is started, open the electromagnetic valve.

Advantageous Effects

According to the disclosure, even when the brake operation member is operated in the state in which the electromagnetic valve is closed, the activation-time control is executed to increase the reaction force pressure. That is, the fluid is supplied to the servo chamber by the activation-time control, so that the master piston slides in one direction, a volume of the reaction force chamber decreases, and the reaction force pressure increases. Then, when the determination section determines that the pressure difference between the reaction force pressure and the separation pressure is small, the electromagnetic valve is opened. By opening the electromagnetic valve in a state in which the pressure difference is small or 0, the input piston and the brake operation member are prevented from moving in one direction when the electromagnetic valve is opened. That is, according to the disclosure, it is possible to improve a brake feeling when the electromagnetic valve is opened.

DESCRIPTION OF EMBODIMENTS

Figure 1:
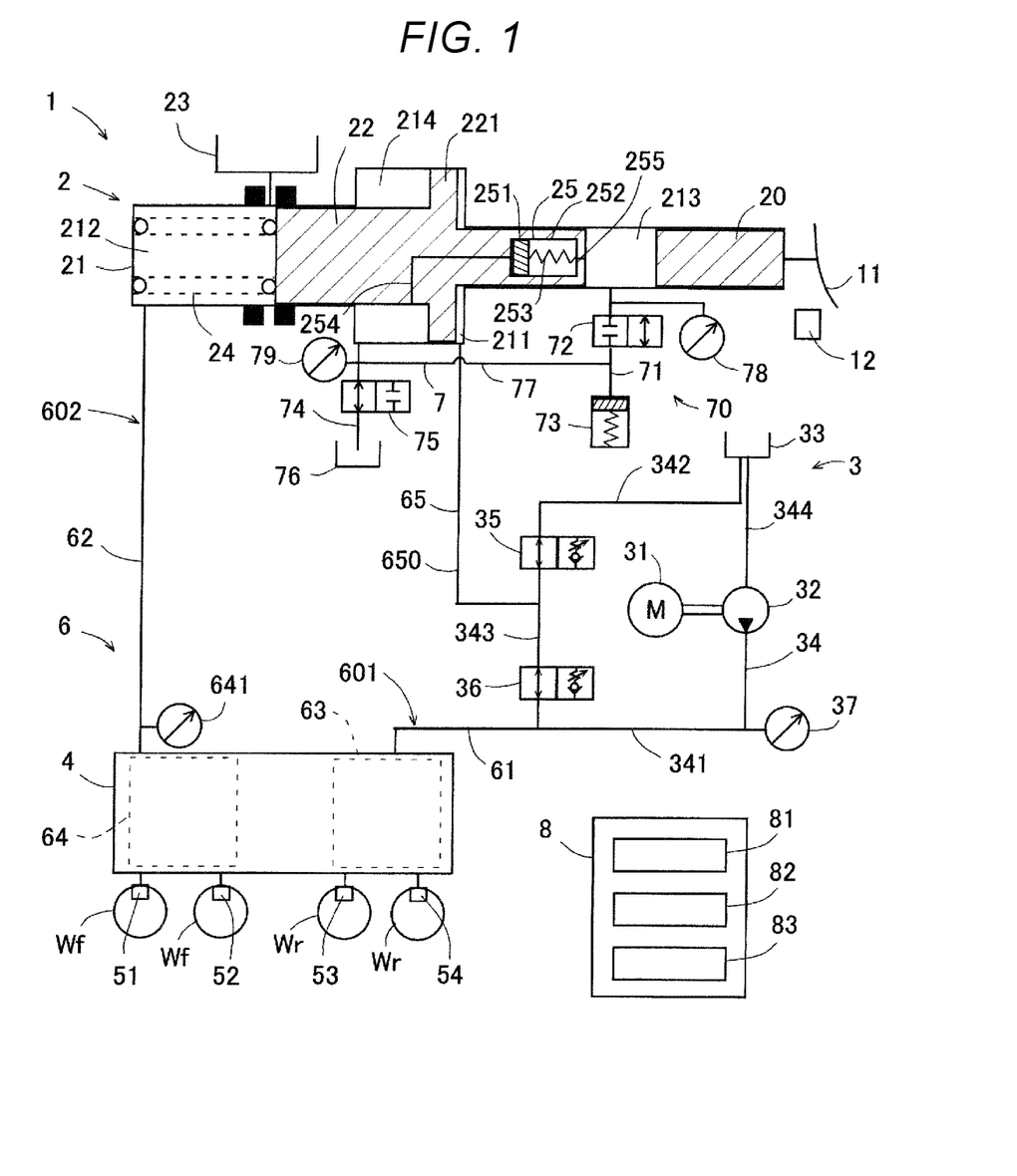
FIG. 1 is a configuration diagram of a braking control device according to the present embodiment.

Hereinafter, the present embodiment will be described with reference to the drawings. The drawings used in the description are conceptual diagrams, and the shape of each part is not precise. A braking control device 1 according to the present embodiment is a device applied to a vehicle, and as illustrated in FIG. 1, includes a master cylinder unit 2, a pressurization unit 3, an actuator 4, and a brake ECU (corresponding to a "control device") 8.

The master cylinder unit 2 is configured to supply fluid to wheel cylinders 51, 52 of front wheels Wf. The master cylinder unit 2 includes an input piston 20, a master cylinder 21, a master piston 22, a reservoir 23, a spring 24, and a pressure adjustment mechanism 25. The input piston 20 is a piston member, and slides in the master cylinder 21 in conjunction with an operation of a brake pedal 11 which is a brake operation member. A stroke sensor 12 that detects a stroke (corresponding to an "operation amount") of the brake pedal 11 is provided in the braking control device 1.

The master cylinder 21 is a cylinder member of which an internal space is partitioned into a servo chamber 211 and a master chamber 212 by the master piston 22. More specifically, the servo chamber 211, the master chamber 212, a separation chamber 213, and a reaction force chamber 214 are formed inside the master cylinder 21. The servo chamber 211 and the master chamber 212 will be described later.

The separation chamber 213 is partitioned by the master cylinder 21, the input piston 20, and the master piston 22. The master piston 22 and the input piston 20 are disposed to face each other with a predetermined distance therebetween, that is, with the separation chamber 213 interposed therebetween. The separation chamber 213 is connected to a stroke simulator 73 via a fluid passage 71 and a normally closed electromagnetic valve 72. A reaction force against forward movement of the input piston 20, which is a fluid pressure in the separation chamber 213, is formed by the stroke simulator 73 when the electromagnetic valve 72 is in an open state. A pressure sensor 78 connected to the fluid passage 71 detects a separation pressure, which is the fluid pressure in the separation chamber 213, and a stepping force of a driver applied to the brake pedal 11.

The reaction force chamber 214 is partitioned by the master cylinder 21 and the master piston 22. The reaction force chamber 214 is formed such that a volume thereof decreases when the master piston 22 moves forward and increases when the master piston 22 moves backward. The reaction force chamber 214 is connected to a reservoir 76 via a fluid passage 74 and a normally opened electromagnetic valve 75. A portion of the fluid passage 74 between the electromagnetic valve 75 and the reaction force chamber 214 is connected to, via a fluid passage 77, a portion of the fluid passage 71 between the electromagnetic valve 72 and the stroke simulator 73. In this manner, the portion of the fluid passage 74, the fluid passage 77, and the portion of the fluid passage 71 form a connection path 7 that connects the separation chamber 213 and the reaction force chamber 214. The electromagnetic valve 75 is provided in a fluid passage (a portion of the fluid passage 74) that connects the connection path 7 and the reservoir 76. A pressure sensor 79 connected to the fluid passage 74 detects a reaction force pressure which is a fluid pressure in the reaction force chamber 214.

The master piston 22 is a piston member disposed in the master cylinder 21. The master piston 22 is driven by a force corresponding to a fluid pressure in the servo chamber 211 and slides in the master cylinder 21 so as to change a volume of the master chamber 212, so that a master pressure, which is a fluid pressure, is generated in the master chamber 212. The master piston 22 has a large diameter portion 221 formed to have a diameter larger than those of other portions of the master piston 22, such that the servo chamber 211 and the reaction force chamber 214 are partitioned.

The servo chamber 211 is formed behind the large diameter portion 221 of the master piston 22. The servo chamber 211 is formed so as to face the reaction force chamber 214 via the large diameter portion 221. A servo pressure, which is a fluid pressure of the servo chamber 211, is a driving force which is a force for pressing a rear end surface of the large diameter portion 221 to move the master piston 22 forward. The pressurization unit 3 is connected to the servo chamber 211 via a connection fluid passage 65 to be described later.

The master chamber 212 is formed on a bottom surface side of the master cylinder 21, that is, in front of the master piston 22. The master chamber 212 is formed such that the volume thereof decreases when the master piston 22 moves forward and increases when the master piston 22 moves backward. The master chamber 212 is connected to the actuator 4 via a second supply path 62.

As described above, the master cylinder unit 2 includes the input piston 20 that slides in accordance with the operation of the brake pedal 11, the separation chamber 213 of which a volume changes in accordance with the sliding of the input piston 20, the servo chamber 211 of which a volume increases in accordance with a supply of fluid from the pressurization unit 3, the master piston 22 that slides in one direction in accordance with the increase in the volume of the servo chamber 211, and the reaction force chamber 214 of which the volume decreases in accordance with the sliding of the master piston 22 in one direction.

The reservoir 23 is a tank that stores fluid, and is maintained at an atmospheric pressure. A fluid passage connecting the reservoir 23 and the master chamber 212 communicates when the master piston 22 is at an initial position, and is blocked when the master piston 22 moves forward by a predetermined distance from the initial position. The spring 24 presses the master piston 22 toward the initial position (that is, rearward). The initial position of the master piston 22 is a position where the master piston 22 is stopped in a state in which a brake operation is not performed.

For example, when a power supply failure occurs, each of the electromagnetic valves 72, 75, 35, 36 is brought into a non-energized state, and thus, the electromagnetic valve 72 is closed and the electromagnetic valve 75 is opened. As a result, the separation chamber 213 is sealed, a separation distance between the input piston 20 and the master piston 22 is fixed, and the reaction force chamber 214 communicates with the reservoir 76. Hereinafter, a state in which the separation distance is fixed is referred to as a separation locked state. In the separation locked state, the master piston 22 also moves forward in accordance with the forward movement of the input piston 20. That is, in the separation locked state, the master pressure can be generated only by the stepping force of the driver. In the separation locked state, the master piston 22 is driven only by an operation driving force generated by a brake operation of the driver. The separation locked state can be formed not only at the time of the power supply failure but also by control of the brake ECU 8. That is, the brake ECU 8 controls the electromagnetic valves 72, 75, so that a control mode (connection state) can be switched between a separation locked mode in which the separation locked state is formed and a by-wire mode which is a normal state. As described above, the braking control device 1 includes a blocking mechanism 70 that permits or blocks transmission of the operation driving force to the master piston 22. A state before activation of the brake ECU 8 is a state in which electric power is not supplied to the first electromagnetic valve 72 and the second electromagnetic valve 75, and is the same as the separation locked state.

The pressure adjustment mechanism 25 is a device for preventing the reaction force pressure from becoming higher than the separation pressure. The pressure adjustment mechanism 25 according to the present embodiment is provided in the master piston 22. The pressure adjustment mechanism 25 includes a balance piston 251, a housing chamber 252 in which the balance piston 251 is slidably housed, and a spring 253 that biases the balance piston 251 forward (toward the reaction force chamber 214). The master piston 22 is provided with a fluid passage 254 that communicates a side of the housing chamber 252 in front of the balance piston 251 with the reaction force chamber 214, and a liquid passage 255 that communicates a side of the housing chamber 252 behind the balance piston 251 with the separation chamber 213. When the reaction force pressure becomes higher than the separation pressure, the balance piston 251 slides backward. By the movement of the balance piston 251, a portion of the housing chamber 252 communicating with the reaction force chamber 214 is expanded, and the reaction force pressure is reduced. Therefore, a pressure difference between the reaction force pressure and the separation pressure is adjusted, so that the reaction force pressure does not become higher than the separation pressure.

The pressurization unit 3 is a device that discharges fluid. Specifically, the pressurization unit 3 is a device that supplies the fluid to the actuator 4 and the connection fluid passage 65. The pressurization unit 3 supplies the fluid to a first fluid pressure circuit 63 in the actuator 4 via a first supply path 61. The first fluid pressure circuit 63 is connected to wheel cylinders 53, 54. The connection fluid passage 65 is a fluid passage that connects the first supply path 61 and the servo chamber 211 of the master cylinder 21. When an electromagnetic valve 36 described later is in an open state or when the electromagnetic valve 36 is not provided, the fluid supplied to the connection fluid passage 65 by the pressurization unit 3 is supplied to the first fluid pressure circuit 63 and the servo chamber 211.

The pressurization unit 3 includes a motor 31, a pump (corresponding to a "discharge device") 32, a reservoir 33, an annular fluid passage 34, the electromagnetic valve 35, and the electromagnetic valve 36. The motor 31 is an electric motor of which driving is controlled by the brake ECU 8 to drive the pump 32. The pump 32 is driven by a driving force of the motor 31. The pump 32 discharges the fluid at a flow rate corresponding to the driving (for example, rotation speed) of the motor 31. The pump 32 sucks the fluid stored in the reservoir 33 and discharges the fluid to the first supply path 61 and the connection fluid passage 65 via the annular fluid passage 34. The annular fluid passage 34 is a fluid passage that connects a discharge port and a suction port of the pump 32, and includes fluid passages 341, 342, 343, 344.

The fluid passage 341 connects the discharge port of the pump 32 to the first supply path 61 and the connection fluid passage 65. The fluid passage 342 connects the connection fluid passage 65 and the reservoir 33. The electromagnetic valve 35 is provided in the fluid passage 342. The fluid passage 343 is a portion of the connection fluid passage 65 that connects the fluid passage 341 and the fluid passage 342. That is, the connection fluid passage 65 includes a fluid passage 650 that connects the servo chamber 211 and the annular fluid passage 34, and the fluid passage 343 that is a portion of the annular fluid passage 34. The electromagnetic valve 36 is provided in the fluid passage 343, that is, a partial section of the connection fluid passage 65. The fluid passage 344 connects the reservoir 33 and the suction port of the pump 32.

The fluid passage 341 is provided with a pressure sensor 37 that detects a fluid pressure in the fluid passage 341 and the first supply path 61. The fluid pressure detected by the pressure sensor 37 can be considered to be a fluid pressure supplied by the pump 32 to the first fluid pressure circuit 63 and the connection fluid passage 65. The servo pressure, which is the fluid pressure in the servo chamber 211, fluctuates depending on a control state of the electromagnetic valve 36. The reservoir 33, the reservoir 76, and the reservoir 23 may be formed of a single common reservoir (for example, the reservoir 23).

The electromagnetic valve 35 and the electromagnetic valve 36 are the normally opened electromagnetic valves, and are linear valves capable of controlling a pressure difference between upstream and downstream sides. The electromagnetic valve 35 and the electromagnetic valve 36 make a fluid pressure on the upstream side higher than a fluid pressure on the downstream side based on magnitude of a control current from the brake ECU 8. Target pressure differences of the electromagnetic valve 35 and the electromagnetic valve 36 are determined by the magnitude of the control current. It can be said that the electromagnetic valve 35 and the electromagnetic valve 36 form a restricted state in the fluid passage according to the control current.

A first fluid passage 601 is a flow passage that connects the servo chamber 211 and the wheel cylinders 53, 54. The first fluid passage 601 includes the connection fluid passage 65, the first supply path 61, and the first fluid pressure circuit 63. The first fluid passage 601 may also be referred to as a first system or a rear system.

A second fluid passage 602 is a flow passage that connects the master chamber 212 and the wheel cylinders 51, 52. The second fluid passage 602 may also be referred to as a second system or a front system. The second fluid passage 602 includes the second supply path 62 and a second fluid pressure circuit 64. The second supply path 62 is a flow passage that connects the master chamber 212 and the second fluid pressure circuit 64. The second fluid pressure circuit 64 is a flow passage that connects the second supply path 62 and the wheel cylinders 51, 52.

When a target wheel pressure is set with respect to a stroke, the brake ECU 8 controls the target pressure difference of the electromagnetic valve 35 and drives the pump 32. As a result, the fluid pressure on the upstream side of the electromagnetic valve 35 (on the pump 32 side) can be increased by the target pressure difference with respect to the fluid pressure (here, atmospheric pressure) of the reservoir 33, which is the fluid pressure on the downstream side of the electromagnetic valve 35. When different fluid pressures are generated in the first fluid passage 601 and the second fluid passage 602 without using the actuator 4, the brake ECU 8 controls the target pressure difference of the electromagnetic valve 36 and drives the pump 32. As a result, the fluid pressure on the upstream side of the electromagnetic valve 36 (on the pump 32 side) can be increased by the target pressure difference with respect to the fluid pressure in the fluid passage between the electromagnetic valve 36 and the electromagnetic valve 35, which is fluid pressure on the downstream side of the electromagnetic valve 36, that is, the servo pressure.

When the same wheel pressure is generated by the front and rear wheels Wf, Wr, the brake ECU 8 controls the electromagnetic valve 35 and does not control the electromagnetic valve 36. The electromagnetic valve 36 is used when the fluid pressure of the wheel cylinders 51, 52 of the front wheels Wf is controlled to be lower than the fluid pressure of the wheel cylinders 53, 54 of the rear wheels Wr in consideration of, for example, a regenerative braking force generated in the front wheels Wf.

The actuator 4 is a so-called ESC actuator configured to be capable of pressurizing each wheel pressure. The actuator 4 includes the first fluid pressure circuit 63 and the second fluid pressure circuit 64. Each of the fluid pressure circuits 63, 64 is provided with an electromagnetic valve, a pump, a pressure regulating reservoir, and the like (not illustrated). The brake ECU 8 controls the electromagnetic valves and the pumps disposed in each of the fluid pressure circuits 63, 64, so that the wheel pressures can be pressurized, decreased, or maintained. The actuator can execute antiskid control and sideslip prevention control based on a command from the brake ECU 8. The second fluid pressure circuit 64 or the second supply path 62 is provided with a pressure sensor 641 that detects the master pressure.

The brake ECU 8 is an electronic control unit including a CPU, memory, and the like. Specifically, the brake ECU 8 includes one or a plurality of processors, and various kinds of control are executed by operations of the processors. The brake ECU 8 controls the blocking mechanism 70 and the pressurization unit 3 based on information from various sensors such as the stroke sensor 12 and the pressure sensors 37, 78, 79. The brake ECU 8 further controls the actuator 4 based on information from various sensors such as the stroke sensor 12 and the pressure sensor 641. The brake ECU 8 may include a plurality of ECUs such as an ECU that controls the pressurization unit 3 and an ECU that controls the actuator 4.

When the brake pedal 11 is operated, the brake ECU 8 sets a target deceleration and the target wheel pressure in accordance with the stroke and/or the stepping force. In order to set the control mode to the by-wire mode, the brake ECU 8 normally opens the electromagnetic valve 72 and closes the electromagnetic valve 75. As a result, the reaction force chamber 214 and the reservoir 76 are blocked from each other, and the separation chamber 213, the reaction force chamber 214, and the stroke simulator 73 communicate with each other. In the separation chamber 213 and the reaction force chamber 214, the fluid pressure (separation pressure, reaction force pressure) corresponding to the operation of the brake pedal 11 is generated as a reaction force.

When the regenerative braking force is not generated, the brake ECU 8 controls the pump 32 and the electromagnetic valve 35 of the pressurization unit 3 in accordance with the target wheel pressure. In this case, the electromagnetic valve 36 is not controlled, and the open state is maintained due to not being energized. The brake ECU 8 drives the pump 32, sets the target pressure difference of the electromagnetic valve 35 corresponding to the target wheel pressure, and applies the control current corresponding to the target pressure difference to the electromagnetic valve 35.

The pump 32 sucks the fluid from the reservoir 33 and supplies the fluid to the first fluid passage 601. The pump 32 discharges the fluid at a flow rate corresponding to the driving of the motor. The fluid discharged from the pump 32 is supplied to the first fluid pressure circuit 63 and is also supplied to the servo chamber 211 via the connection fluid passage 65. A fluid pressure corresponding to the target pressure difference of the electromagnetic valve 35 is generated in the servo chamber 211 and the first fluid passage 601.

When the servo pressure is increased by the above control, the master piston 22 moves forward, and the master pressure is increased by reduction of the master chamber 212. That is, the fluid pressure in the second fluid passage 602 connected to the master chamber 212 also increases. By the control of the pump 32 and the electromagnetic valve 35, a fluid pressure corresponding to the servo pressure (upstream pressure) is generated in the wheel cylinders 53, 54 via the first fluid passage 601, and is generated in the wheel cylinders 51, 52 via the second fluid passage 602.

The brake ECU 8 executes brake control so as to achieve the target wheel pressure and achieve the target deceleration. More specifically, the brake ECU 8 sets the target wheel pressure and a target servo pressure in accordance with the stroke. The brake ECU 8 stores a map indicating a relationship between the stroke and the target pressures (target wheel pressure, target servo pressure). The brake ECU 8 sets the target servo pressure and the target wheel pressure based on the stroke and the map. The brake ECU 8 estimates each wheel pressure based on a detection value of the pressure sensor 641. The brake ECU 8 estimates each wheel pressure based on a detection value (servo pressure) of the pressure sensor 37. The brake ECU 8 estimates each wheel pressure in consideration of a control state of the actuator.

As described above, the braking control device 1 according to the present embodiment includes the connection path 7 that connects the separation chamber 213 and the reaction force chamber 214, the electromagnetic valve 72 provided in the connection path 7, and the brake ECU 8 that controls the electromagnetic valve 72 and the pressurization unit 3. After the activation, the brake ECU 8 switches the control mode from the separation locked mode to the by-wire mode. An activation condition of the brake ECU 8 is, for example, that a door of a driver's seat is opened, that ignition is turned on, that the brake pedal 11 is operated, or the like.

(Activation-Time Control)

The brake ECU 8 is configured to execute activation-time control when the brake pedal 11 is operated in a state in which the electromagnetic valve 72 is closed. The situation in which the brake pedal 11 is operated in the state in which the electromagnetic valve 72 is closed occurs, for example, when the brake pedal 11 is operated before the brake ECU 8 is activated.

The brake ECU 8 includes a specified control section 81, a determination section 82, and a valve control section 83. When the brake pedal 11 is operated in the state in which the electromagnetic valve 72 is closed, the specified control section 81 executes the activation-time control that supplies the fluid to the servo chamber 211 based on a predetermined pattern. The predetermined pattern according to the present embodiment corresponds to a pattern in which a constant flow rate is supplied to the servo chamber 211 per unit time regardless of the operation of the brake pedal 11. Therefore, in the present embodiment, when the brake pedal 11 is operated in the state in which the electromagnetic valve 72 is closed, the specified control section 81 supplies the fluid to the servo chamber 211 by the pressurization unit 3 regardless of the stroke of the brake pedal 11. In other words, when the brake pedal 11 is operated before the brake ECU 8 is activated, the specified control section 81 controls the pressurization unit 3 to pressurize the servo chamber 211 regardless of magnitude of the stroke after the brake ECU 8 is activated.

For example, immediately after the brake ECU 8 is activated, the specified control section 81 determines whether the activation-time control is necessary based on a detection result of the stroke sensor 12. When a stroke larger than 0 (or, for example, a stroke equal to or larger than a third threshold value described later) is detected by the stroke sensor 12 immediately after the brake ECU 8 is activated, the specified control section 81 determines that the activation-time control is necessary. When it is determined that the activation-time control is necessary, the specified control section 81 executes the activation-time control at a predetermined timing without switching the control mode to the by-wire mode.

When it is determined that the activation-time control is necessary, the specified control section 81 drives the pressurization unit 3 at a predetermined timing in order to pressurize the servo chamber 211. The predetermined timing is set to a timing after the brake ECU 8 is activated. The predetermined timing according to the present embodiment is set to a timing at which the ignition is turned on. That is, when the ignition is turned on in a state in which it is determined that the activation-time control is necessary, the specified control section 81 executes the activation-time control.

When the activation-time control is executed, the specified control section 81 closes the electromagnetic valve 75 to seal the reaction force chamber 214. This state can be considered as an activation state that is neither the separation locked mode nor the by-wire mode. The specified control section 81 adjusts the flow rate at which the pressurization unit 3 supplies the fluid to the servo chamber 211. For example, the specified control section 81 controls the flow rate supplied to the servo chamber 211 to be constant during the activation-time control.

The specified control section 81 according to the present embodiment executes the activation-time control until the servo pressure reaches a preset specified pressure. The specified control section 81 grasps the servo pressure based on the detection value of the pressure sensor 37. The specified pressure is set to a pressure corresponding to a braking force capable of maintaining a stop state. The specified control section 81 may change the specified pressure in accordance with a stop state (hill road, or the like) of a vehicle. The stop state on, for example, a hill road can be detected by an acceleration sensor (not illustrated) or the like.

When the target servo pressure is higher than the specified pressure after the servo pressure reaches the specified pressure and the activation-time control is completed, the brake ECU 8 maintains the servo pressure at the specified pressure. When the target servo pressure is equal to or lower than the specified pressure after the activation-time control is completed, the brake ECU 8 controls the pressurization unit 3, so that the servo pressure matches the target servo pressure.

The determination section 82 determines whether the pressure difference between the reaction force pressure and the separation pressure (hereinafter, referred to as a "specific pressure difference") is equal to or less than a first threshold value. When a difference between the stroke (detection value of the stroke sensor 12) and a predetermined amount is equal to or less than a second threshold value after the activation-time control is completed, the determination section 82 according to the present embodiment determines that a specific pressure difference is equal to or less than the first threshold value. The predetermined amount is set to, for example, an amount of a stroke corresponding to the specified pressure, in other words, an amount of a stroke that causes the target servo pressure becoming the specified pressure. As will be described later, when the stroke at the time of completion of the activation-time control is less than the predetermined amount, the determination section 82 according to the present embodiment determines that the specific pressure difference is equal to or less than the first threshold value.

When the determination section 82 determines that the specific pressure difference is equal to or less than the first threshold value after the activation-time control is started, the valve control section 83 opens the electromagnetic valve 72. As described above, the brake ECU 8 executes the activation-time control under the specific situation, opens the electromagnetic valve 72 when the predetermined condition is satisfied, and switches the control mode to the by-wire mode.

Here, the activation-time control will be described with an example. In the example illustrated in FIG. 2, at a time t11, the brake pedal 11 is operated in the state in which the electromagnetic valve 72 is closed, and the brake ECU 8 is activated accordingly. That is, the stroke increases before the brake ECU 8 is activated. By stepping on the brake pedal 11 in the state in which the electromagnetic valve 72 is closed, the separation pressure increases. The target servo pressure also increases as the stroke increases. Since the stroke is not 0 when the brake ECU 8 is activated, the specified control section 81 determines that the activation-time control is necessary. Thereafter, as the operation of the brake pedal 11 is stopped and the stroke becomes constant, the separation pressure and the target servo pressure also become constant.

Figure 2:
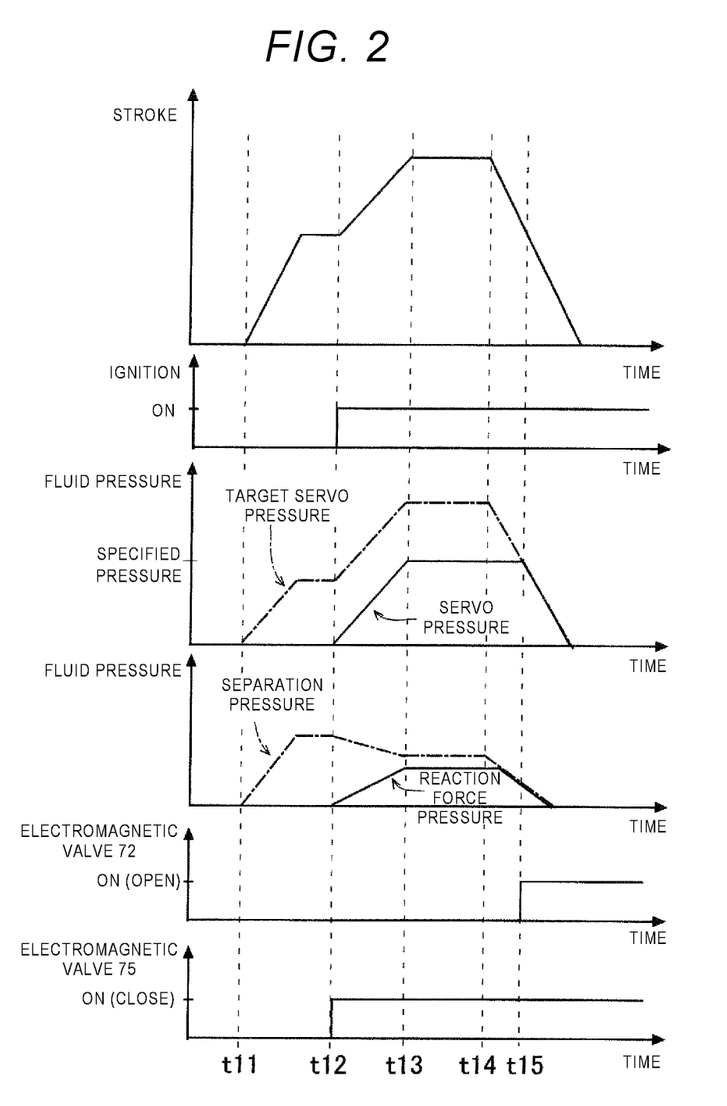
FIG. 2 is a time chart illustrating an example of activation-time control according to the present embodiment.

At a time t12, the activation-time control is executed in conjunction with the ignition being turned on. That is, the specified control section 81 closes the electromagnetic valve 75 and drives the pressurization unit 3. Accordingly, the fluid is supplied to the servo chamber 211 to increase the servo pressure, and the master piston 22 moves forward to increase the reaction force pressure. As the master piston 22 gradually moves forward, the input piston 20 also gradually moves forward while the separation pressure is slightly reduced to expand the separation chamber 213. As a result, the stroke gradually increases, and the target servo pressure also gradually increases.

At a time t13, the servo pressure reaches the specified pressure, and the activation-time control is completed. The specified control section 81 stops the pressurization of the servo pressure by the pressurization unit 3. The target servo pressure when the servo pressure reaches the specified pressure is higher than the specified pressure, but the servo pressure is maintained at the specified pressure regardless of the target servo pressure during the activation-time control and during a period from the completion of the activation-time control until the control mode is switched to the by-wire mode (time t13 to time t15).

At a time t14, when the driver starts to make the brake pedal 11 return, the stroke and the target servo pressure decrease accordingly. Then, when the stroke decreases to the predetermined amount and the target servo pressure decreases to the specified pressure (time t15), the determination section 82 determines that the specific pressure difference is equal to or less than the first threshold value. In this example, the second threshold value is set to 0.

At the time t14 and thereafter, as the stroke decreases, the separation chamber 213 expands and the separation pressure decreases. Then, according to the setting of the map indicating the relationship between the stroke and the target servo pressure, the separation pressure becomes equal to the reaction force pressure before the target servo pressure decreases to the specified pressure (that is, between the time t14 and the time t15). Thereafter, the separation pressure decreases as the stroke decreases, but the reaction force pressure also decreases following the separation pressure by the operation of the pressure adjustment mechanism 25. That is, when the stroke decreases to the predetermined amount, that is, at the time t15, the reaction force pressure and the separation pressure are substantially the same pressure (specific pressure difference being 0). In this example, it can be considered that the first threshold value is set to 0.

At the time t15, the determination section 82 determines that the specific pressure difference is equal to or less than the first threshold value, and the valve control section 83 opens the electromagnetic valve 72. When the electromagnetic valve 72 is in the open state while the electromagnetic valve 75 is in a close state, a state of the braking control device 1 is switched from the activation state to the by-wire mode. Then, at the time t15 and thereafter, the brake ECU 8 controls the pressurization unit 3 and the like, so that the servo pressure matches the target servo pressure as in a normal state.

Here, the activation-time control will be further described with another example. In the example illustrated in FIG. 3, at a time t21, the brake pedal 11 is operated under the specific situation, and the brake ECU 8 is activated accordingly. Similarly to the example illustrated in FIG. 2, the separation pressure and the target servo pressure increase as the stroke increases. In the example illustrated in FIG. 3, the stroke operated by the driver under the specific situation is smaller than that in the example illustrated in FIG. 2.

Figure 3:
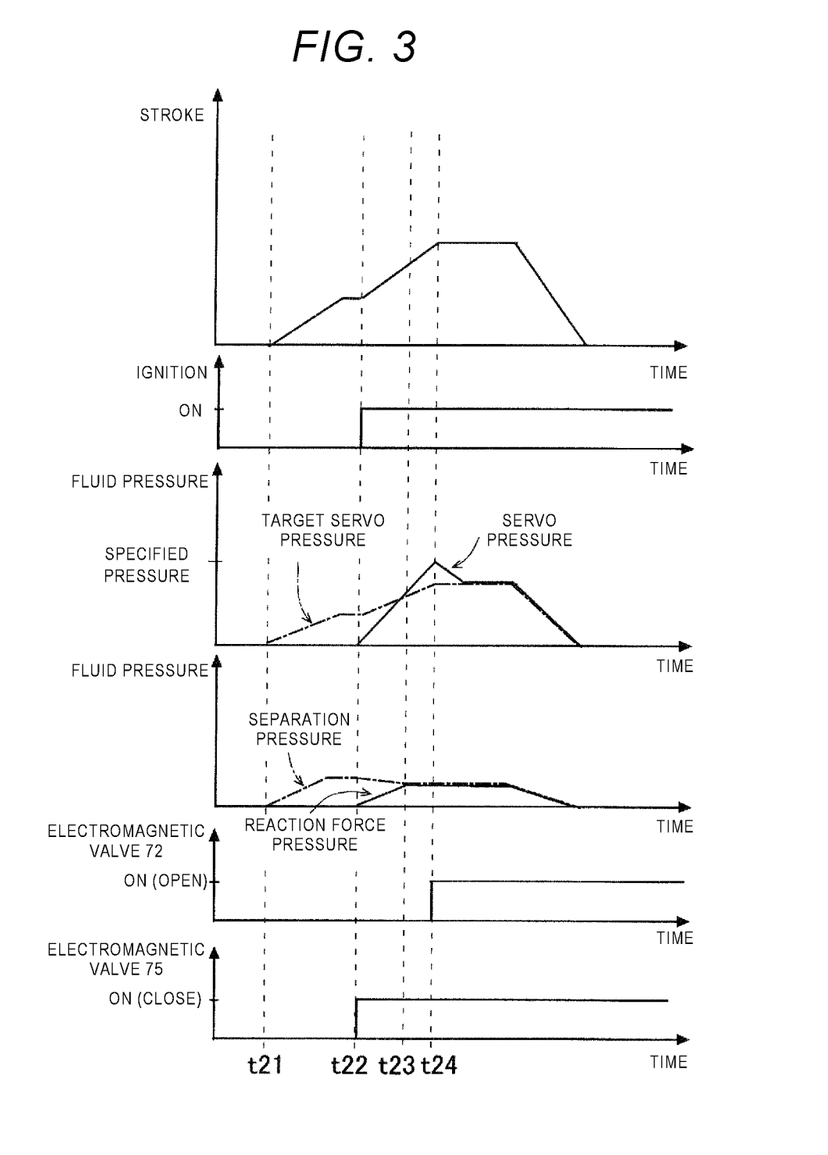
FIG. 3 is a time chart illustrating an example of the activation-time control according to the present embodiment.

At a time t22, the activation-time control is executed in conjunction with the ignition being turned on. As a result, similarly to the example illustrated in FIG. 2, the servo pressure and the reaction force pressure gradually increase, and the stroke also gradually increases. Then, at a time t23, the reaction force pressure and the separation pressure become the same pressure. At the time t23 and thereafter, although the servo pressure increases, the reaction force pressure and the separation pressure are maintained at the same pressure by the operation of the pressure adjustment mechanism 25.

At a time t24, the servo pressure reaches the specified pressure, and the activation-time control is completed. When the activation-time control is completed (time t24), the target servo pressure is less than the specified pressure, that is, the stroke is less than the predetermined amount. Since the stroke when the activation-time control is completed is less than the predetermined amount, the determination section 82 determines that the specific pressure difference is equal to or less than the first threshold value. When the target servo pressure is less than the specified pressure, the reaction force pressure becomes higher than the separation pressure, but the specific pressure difference is substantially zero due to the operation of the pressure adjustment mechanism 25. Therefore, when the target servo pressure is less than the specified pressure, the determination section 82 can determine that the specific pressure difference is equal to or less than the first threshold value.

At the time t24, the valve control section 83 opens the electromagnetic valve 72. As a result, the state of the braking control device 1 is switched from the activation state to the by-wire mode. At the time t24 and thereafter, the brake ECU 8 gradually decreases the servo pressure, so that the servo pressure matches the target servo pressure. Thereafter, the brake ECU 8 controls the pressurization unit 3 and the like, so that the servo pressure matches the target servo pressure as in the normal state.

(Effects)

According to the present embodiment, even when the brake pedal 11 is operated in the state in which the electromagnetic valve 72 is closed, the activation-time control is executed to increase the reaction force pressure. That is, the fluid is supplied to the servo chamber 211 by the activation-time control, so that the master piston 22 slides forward, the volume of the reaction force chamber 214 decreases, and the reaction force pressure increases. Then, when the determination section 82 determines that the specific pressure difference is small, the electromagnetic valve 72 is opened. By opening the electromagnetic valve 72 in the state in which the specific pressure difference is small or 0, the input piston 20 and the brake pedal 11 are prevented from moving forward when the electromagnetic valve 72 is opened. That is, according to the present embodiment, it is possible to improve a brake feeling when the electromagnetic valve 72 is opened.

Further, by executing the activation-time control, the servo pressure is pressurized in the state in which the electromagnetic valve 75 is closed, and the master piston 22 moves forward. As the master piston 22 moves forward, the input piston 20 and the brake pedal 11 also gradually move forward. Here, in the present embodiment, since the activation-time control is started at a timing when the ignition (ignition switch) is turned on, a gradual change in a position of the brake pedal 11 due to the execution of the activation-time control hardly gives the driver a feeling of discomfort. By making the operation of the driver (for example, turning on the ignition) in conjunction with the movement of the brake pedal 11 due to the execution of the activation-time control, the feeling of discomfort given to the driver can be reduced. A moving speed of the input piston 20 as the activation-time control is executed can be controlled by adjusting the flow rate of the fluid supplied to the servo chamber 211 during the activation-time control. As compared with the forward movement of the brake pedal 11 that occurs when the electromagnetic valve 72 is opened due to the specific pressure difference when the activation-time control is not executed, the forward movement of the brake pedal 11 when the activation-time control is executed is moderate, and the feeling of discomfort is hardly given to the driver.

In the present embodiment, the servo pressure is pressurized by the activation-time control until the servo pressure reaches the specified pressure. As a result, in the activation-time control, it is sufficient to only increase the servo pressure to the specified pressure, and complicated control is not necessary. In addition, the pressurization is stopped when the servo pressure reaches the specified pressure, so that unnecessary pressurization of the servo pressure is prevented. According to this configuration, it is also possible to shorten a time until the control mode is switched to the by-wire mode.

Since the pressure adjustment mechanism 25 is included in the configuration of the present embodiment, when the reaction force pressure is higher than the separation pressure, the pressure difference is reduced by the pressure adjustment mechanism 25. Therefore, even when the reaction force pressure generated by the supplied servo pressure is larger than the separation pressure generated by the operation of the pedal, the pressure difference between the reaction force pressure and the separation pressure is reduced by the pressure adjustment mechanism 25. Since the electromagnetic valve 72 can be opened even in the state in which the reaction force pressure is larger than the separation pressure, it is not necessary to control the servo pressure at such accuracy with which the same pressure as the separation pressure is generated in the reaction force chamber. When an operation amount of the brake pedal 11 is less than the predetermined amount, the servo pressure and the reaction force pressure increase due to the activation-time control, but the reaction force pressure and the separation pressure become substantially the same pressure due to the operation of the pressure adjustment mechanism 25. Therefore, in this case, even when it is determined that the pressure difference between the reaction force pressure and the separation pressure is equal to or less than the first threshold value and the electromagnetic valve 72 is opened, the brake pedal 11 is prevented from moving forward. That is, it is possible to switch the control mode to the by-wire mode at an early stage under a simple determination condition using the configuration.

In the present embodiment, the pressurization unit 3 can supply the fluid to the servo chamber 211 at the flow rate corresponding to the driving of the motor 31. With this configuration, the servo pressure can be increased with high accuracy (for example, gradually), and a moving speed of the master piston 22 and the like can be adjusted with high accuracy. Accordingly, the forward movement of the input piston 20 due to the execution of the activation-time control can be moderated, and the feeling of discomfort given to the driver can be further reduced. For example, by setting the flow rate of the fluid supplied to the servo chamber 211 constant, the master piston 22 can be prevented from rapid moving with high accuracy.

(Others)

The disclosure is not limited to the above-described embodiment. For example, the determination section 82 may determine whether the specific pressure difference is equal to or less than the first threshold value based on detection results of the pressure sensor (corresponding to a "separation pressure sensor") 78 that detects the separation pressure and the pressure sensor (corresponding to a "reaction force pressure sensor") 79 that detects the reaction force pressure. According to this configuration, the specific pressure difference can be directly detected, and deterioration of the brake feeling when the electromagnetic valve 72 is opened can be prevented. In a situation in which the activation-time control is executed, since correction of the pressure sensors 78, 79 is not executed yet, there is a possibility that a deviation occurs between the pressure sensors 78, 79. Therefore, from a viewpoint of further improving robustness, it is preferable to adopt the determination condition (comparison between the stroke and the predetermined amount) of the above-described embodiment for the specific pressure difference. The determination performed on the specific pressure difference based on the detection results of the pressure sensors 78, 79 may be set as a condition or an OR condition with the determination condition of the above embodiment.

In addition, the pressure adjustment mechanism 25 is not limited to one including the balance piston 251, and may include a check valve. The pressure adjustment mechanism 25 may be provided in a portion other than the master piston 22. In addition, the braking control device 1 may not include the pressure adjustment mechanism 25. Even when the pressure adjustment mechanism 25 is not provided, the determination section 82 can determine whether the specific pressure difference is equal to or less than the first threshold value, by adjusting, for example, the determination condition (the relationship between the stroke and the predetermined amount) and/or using the detection results of the pressure sensors 78, 79. However, by providing the pressure adjustment mechanism 25, the reaction force pressure and the separation pressure become the same pressure in a situation in which the reaction force pressure is relatively high, and thus, it is easier to open the electromagnetic valve 72 in a state in which the specific pressure difference is 0 in terms of control.

In addition, the timing at which the activation-time control is executed is not limited to the above, and may be set, for example, after a predetermined time elapses from the activation of the brake ECU 8. From a viewpoint of noise removal during the activation-time control, it is preferable that the timing at which the activation-time control is executed is after the ignition (switch for activating a vehicle drive device) is turned on. A vehicle drive device is, for example, an engine drive device or a motor drive device.

The specified control section 81 may be configured not to execute the activation-time control when the stroke at the time of the activation of the brake ECU 8 is less than a third threshold value. The third threshold value is set to a value at which the specific pressure difference does not substantially affect the brake feeling when the electromagnetic valve 72 is opened. The third threshold value is set to, for example, a value at which the specific pressure difference generated by the stroke is equal to or less than the first threshold value. According to this configuration, when the stroke at the time of the activation of the brake ECU 8 is fairly small, the electromagnetic valve 72 is opened without the execution of the activation-time control. According to this configuration, the control mode can be switched corresponding to the situation.

The pressurization unit 3 is not limited to the above, and may be, for example, an electric cylinder device (not illustrated). The electric cylinder device includes, for example, a motor, a power conversion mechanism (discharge device) that converts a driving force of the motor into a driving force of a piston, and a cylinder (discharge device) that slidably houses the piston. In this case, fluid in the cylinder is supplied to the servo chamber 211 by forward movement of the piston. Also in this configuration, the fluid can be supplied to the servo chamber 211 at a flow rate corresponding to driving of the motor, and the same effect as that of the above-described embodiment is exhibited. The pressurization unit 3 may have a configuration including, for example, an accumulator, a regulator, and an electromagnetic valve. The servo chamber 211 may be referred to as an input chamber, and the master chamber 212 may be referred to as an output chamber. In the determination condition related to the opening of the electromagnetic valve 72, the predetermined amount may not be a value corresponding to the specified pressure.

In the above embodiment, the activation-time control is executed until the servo pressure reaches the specified pressure. However, the timing at which the activation-time control is completed is not limited thereto. For example, the activation-time control may be completed at a timing when a predetermined time elapses from a start of the activation-time control. In addition, the activation-time control may be completed in response to the supply of a predetermined amount of fluid to the servo chamber. Whether the predetermined amount of fluid is supplied is estimated by, for example, a rotation speed and a driving time of the motor 31 included in the pressurization unit 3. In these cases, whether the pressure difference between the reaction force pressure and the separation pressure when the activation-time control is completed is equal to or less than the first threshold value is determined, so that the same effects as those of the above-described embodiment can be obtained. Whether the pressure difference between the reaction force pressure and the separation pressure is equal to or less than the first threshold value may be determined during the execution of the activation-time control. For example, the determination section 82 may determine whether the pressure difference between the reaction force pressure and the separation pressure is equal to or less than the first threshold value in each predetermined cycle after the activation-time control is executed. In this case, the activation-time control may be completed in response to the determination section 82 determining that the pressure difference between the reaction force pressure and the separation pressure is equal to or less than the first threshold value.

In the above embodiment, the predetermined pattern in the activation-time control is the pattern in which the constant flow rate is supplied to the servo chamber 211. However, the flow rate of the fluid supplied to the servo chamber 211 in the activation-time control may not be constant. For example, the flow rate of the fluid supplied to the servo chamber 211 may gradually increase from the start of the activation-time control and decrease as the servo pressure approaches the specified pressure. The predetermined pattern may be corrected in accordance with the operation amount of the brake pedal 11. For example, the predetermined pattern may be corrected such that the supply amount of the fluid per unit time increases as the operation amount of the brake pedal 11 increases. Similarly, the value of the specified pressure may be corrected according to the operation amount of the brake pedal 11.

The invention claimed is:

1. A braking control device comprising:
    a brake operation member;
    a pressurization unit configured to discharge fluid;
    a master cylinder unit including an input piston configured to slide in accordance with an operation of the brake operation member, a separation chamber of which a volume changes in accordance with the sliding of the input piston, a servo chamber of which a volume increases in accordance with a supply of the fluid from the pressurization unit, a master piston configured to slide in one direction in accordance with an increase in the volume of the servo chamber, and a reaction force chamber of which a volume decreases in accordance with sliding of the master piston in one direction;
    a connection path connecting the separation chamber and the reaction force chamber;
    an electromagnetic valve provided at the connection path; and
    a control device configured to control the electromagnetic valve and the pressurization unit, wherein
    the control device includes
        a specified control section configured to, when the brake operation member is operated in a state in which the electromagnetic valve is closed, execute activation-time control in which the pressurization unit supplies the fluid to the servo chamber based on a predetermined pattern,
        a determination section configured to determine whether a pressure difference between a reaction force pressure, which is a pressure in the reaction force chamber, and a separation pressure, which is a pressure in the separation chamber, is equal to or less than a first threshold value, and
        a valve control section configured to, when the determination section determines that the pressure difference is equal to or less than the first threshold value after the activation-time control is started, open the electromagnetic valve,
    the specified control section executes the activation-time control until a pressure in the servo chamber reaches a preset specified pressure, and
    when a difference between an operation amount of the brake operation member and a predetermined amount is equal to or less than a second threshold value after the activation-time control is completed, the determination section determines that the pressure difference is equal to or less than the first threshold value.

2. The braking control device according to claim 1, wherein
    the master cylinder unit further includes a pressure adjustment mechanism configured to prevent the reaction force pressure from becoming higher than the separation pressure, and
    even when the operation amount of the brake operation member at the time of the completion of the activation-time control is less than the predetermined amount, the determination section determines that the pressure difference is equal to or less than the first threshold value.

3. The braking control device according to claim 2, further comprising:
    a reaction force pressure sensor configured to detect the reaction force pressure; and
    a separation pressure sensor configured to detect the separation pressure, wherein
    the determination section determines whether the pressure difference is equal to or less than the first threshold value based on detection results of the reaction force pressure sensor and the separation pressure sensor.

4. The braking control device according to claim 3, wherein
    the pressurization unit includes a motor, and a discharge device configured to discharge the fluid at a flow rate corresponding to driving of the motor.

5. The braking control device according to claim 1, further comprising:
    a reaction force pressure sensor configured to detect the reaction force pressure; and
    a separation pressure sensor configured to detect the separation pressure, wherein
    the determination section determines whether the pressure difference is equal to or less than the first threshold value based on detection results of the reaction force pressure sensor and the separation pressure sensor.

6. The braking control device according to claim 5, wherein
    the pressurization unit includes a motor, and a discharge device configured to discharge the fluid at a flow rate corresponding to driving of the motor.

7. The braking control device according to claim 2, wherein
    the pressurization unit includes a motor, and a discharge device configured to discharge the fluid at a flow rate corresponding to driving of the motor.

8. The braking control device according to claim 1, wherein
    the pressurization unit includes a motor, and a discharge device configured to discharge the fluid at a flow rate corresponding to driving of the motor.

* * * * *